US008659596B2

(12) United States Patent  
Corazza et al.

(10) Patent No.: US 8,659,596 B2  
(45) Date of Patent: Feb. 25, 2014

(54) REAL TIME GENERATION OF ANIMATION-READY 3D CHARACTER MODELS

(75) Inventors: Stefano Corazza, San Francisco, CA (US); Emiliano Gambaretto, San Francisco, CA (US)

(73) Assignee: Mixamo, Inc., San Francisco, CA (US)

(*) Notice: Subject to any disclaimer, the term of this patent is extended or adjusted under 35 U.S.C. 154(b) by 768 days.

(21) Appl. No.: 12/625,553

(22) Filed: Nov. 24, 2009

(65) Prior Publication Data

US 2010/0134490 A1  Jun. 3, 2010

Related U.S. Application Data

(63) Continuation-in-part of application No. 12/584,117, filed on Aug. 31, 2009, now abandoned.

(60) Provisional application No. 61/200,212, filed on Nov. 24, 2008.

(51) Int. Cl.  
*G06T 15/00* (2011.01)

(52) U.S. Cl.  
USPC ........... 345/420; 345/419; 345/428; 345/473; 345/474; 345/475

(58) Field of Classification Search  
USPC .................. 345/419, 420, 428, 473, 474, 475  
See application file for complete search history.

(56) References Cited

U.S. PATENT DOCUMENTS

| | | | |
|---|---|---|---|
| 6,047,078 A | 4/2000 | Kang | |
| 6,088,042 A | 7/2000 | Handelman et al. | |

(Continued)

FOREIGN PATENT DOCUMENTS

| | | |
|---|---|---|
| EP | 1884896 A2 | 2/2008 |
| WO | 2007132451 A2 | 11/2007 |

(Continued)

OTHER PUBLICATIONS

International Search Report for International Application No. PCT/US 09/65825, date completed Jan. 21, 2010, date mailed Jan. 28, 2010, 3 pgs.

(Continued)

*Primary Examiner* — Phu K Nguyen  
(74) *Attorney, Agent, or Firm* — KPPB LLP

(57) ABSTRACT

Systems and methods for automatically generating animation-ready 3D character models based upon model parameter and clothing selections are described. One embodiment of the invention includes an application server configured to receive the user defined model parameters and the clothing selection via a user interface. In addition, the application server includes a generative model and the application server is configured to generate a 3D anatomical mesh based upon the user defined model parameters using the generative model, the application server includes at least one clothing mesh template including a clothing mesh, a template skeleton, and skinning weights and the application server is configured to apply the clothing mesh from the clothing mesh template corresponding to the user clothing selection to the generated 3D anatomical mesh to create a clothed mesh, the application server is configured to adjust the template skeleton of the clothing mesh template corresponding to the user clothing selection based upon the shape of the clothed mesh, the application server is configured to generate skinning weights based upon the skinning weights of the clothing mesh template corresponding to the user clothing selection, and the application server stores an animation-ready 3D character model including the clothed mesh, the adjusted skeleton, and the generated skinning weights.

21 Claims, 10 Drawing Sheets

(56) References Cited

U.S. PATENT DOCUMENTS

| | | | |
|---|---|---|---|
| 6,278,466 | B1 | 8/2001 | Chen |
| 6,552,729 | B1 | 4/2003 | Di Bernardo et al. |
| 6,554,706 | B2 | 4/2003 | Kim et al. |
| 6,700,586 | B1 | 3/2004 | Demers |
| 6,714,200 | B1 | 3/2004 | Talnykin et al. |
| 7,168,953 | B1 | 1/2007 | Poggio et al. |
| 7,209,139 | B1 | 4/2007 | Keet et al. |
| 7,522,165 | B2 * | 4/2009 | Weaver .......................... 345/420 |
| 7,937,253 | B2 * | 5/2011 | Anast et al. ........................ 703/6 |
| 2002/0050988 | A1 | 5/2002 | Petrov et al. |
| 2003/0164829 | A1 | 9/2003 | Bregler et al. |
| 2003/0169907 | A1 | 9/2003 | Edwards et al. |
| 2003/0208116 | A1 | 11/2003 | Liang et al. |
| 2003/0215130 | A1 | 11/2003 | Nakamura et al. |
| 2004/0021660 | A1 | 2/2004 | Ng-Thow-Hing et al. |
| 2004/0049309 | A1 | 3/2004 | Gardner et al. |
| 2004/0227752 | A1 | 11/2004 | McCartha et al. |
| 2005/0264572 | A1 | 12/2005 | Anast et al. |
| 2006/0002631 | A1 | 1/2006 | Fu et al. |
| 2006/0109274 | A1 | 5/2006 | Alvarez et al. |
| 2006/0134585 | A1 | 6/2006 | Adamo-villani et al. |
| 2006/0171590 | A1 | 8/2006 | Lu et al. |
| 2006/0245618 | A1 | 11/2006 | Boregowda et al. |
| 2006/0267978 | A1 | 11/2006 | Litke et al. |
| 2007/0104351 | A1 | 5/2007 | Yang et al. |
| 2007/0182736 | A1 | 8/2007 | Weaver |
| 2008/0024487 | A1 | 1/2008 | Isner et al. |
| 2008/0031512 | A1 | 2/2008 | Mundermann et al. |
| 2008/0043021 | A1 | 2/2008 | Huang et al. |
| 2008/0158224 | A1 | 7/2008 | Wong et al. |
| 2008/0170077 | A1 | 7/2008 | Sullivan et al. |
| 2008/0180448 | A1 | 7/2008 | Anguelov et al. |
| 2008/0252596 | A1 | 10/2008 | Bell et al. |
| 2009/0027337 | A1 | 1/2009 | Hildreth |
| 2009/0195544 | A1 | 8/2009 | Wrinch |
| 2009/0231347 | A1 | 9/2009 | Omote |
| 2010/0073361 | A1 | 3/2010 | Taylor et al. |
| 2010/0149179 | A1 | 6/2010 | Aguiar et al. |
| 2010/0259547 | A1 | 10/2010 | de Aguiar et al. |
| 2010/0278405 | A1 | 11/2010 | Kakadiaris et al. |
| 2010/0285877 | A1 | 11/2010 | Corazza |
| 2011/0292034 | A1 | 12/2011 | Corazza et al. |
| 2012/0019517 | A1 | 1/2012 | Corazza et al. |
| 2012/0038628 | A1 | 2/2012 | Corazza et al. |
| 2013/0021348 | A1 | 1/2013 | Corazza et al. |
| 2013/0127853 | A1 | 5/2013 | Corazza |
| 2013/0215113 | A1 | 8/2013 | Corazza et al. |
| 2013/0235045 | A1 | 9/2013 | Corazza et al. |

FOREIGN PATENT DOCUMENTS

| | | |
|---|---|---|
| WO | 2009/007701 A1 | 1/2009 |
| WO | 2010/060113 A1 | 5/2010 |
| WO | 2010/129721 A2 | 11/2010 |
| WO | 2010/129721 A3 | 6/2011 |
| WO | 2011/123802 A1 | 10/2011 |
| WO | 2012012753 A1 | 1/2012 |

OTHER PUBLICATIONS

Written Opinion of the International Searching Authority for International Application No. PCT/US 09/65825, date completed Jan. 21, 2010, date mailed Jan. 28, 2010, 6 pgs.

Baran et al., "Automatic rigging and animation of 3D characters", ACM Transactions on Graphics (TOG)—Proceedings of ACM SIGGRAPH 2007, vol. 26 Issue 3, Jul. 2007.

Beaudoin et al., "Adapting Wavelet Compression to Human Motion Capture Clips", GI '07 Proceedings of Graphics Interface, 2007, 6 pgs.

Ju et al., "Reusable Skinning Templates Using Cage-based Deformations", ACM Transactions on Graphics (TOG)—Proceedings of ACM SIGGRAPH Asia 2008, vol. 27 Issue 5, Dec. 2008, 10 pgs.

Park et al., "On-line locomotion generation based on motion blending", ACM SIGGRAPH Symposium on Computer Animation. San Antonio, Jul. 21, 2002, 8 pgs.

Park et al., "On-line motion blending for real-time locomotion generation", Computer Animation & Virtual Worlds. Wiley, UK, vol. 15, No. 3-4, Jul. 2004, pp. 125-138.

International Search Report for International Application No. PCT/US 09/57155, date completed Dec. 22, 2009, date mailed Jan. 12, 2010, 5 pgs.

Written Opinion of the International Searching Authority for International Application No. PCT/US 09/57155, date completed Dec. 22, 2009, date mailed Jan. 12, 2010, 6 pgs.

International Search Report for International Application PCT/US2011/045060, completed Nov. 27, 2011, 2 pgs.

Written Opinion for International Application PCT/US2011/045060, completed Nov. 27, 2011, 5 pgs.

International Search Report for PCT/US2010/033797, filed May 5, 2010, report completed Jun. 11, 2010, 2 pgs.

Written Opinion for PCT/US2010/033797, filed May 5, 2010, completed Jun. 11, 2010, 4 pgs.

Aguiar, E. De et al., "Automatic Conversion of Mesh Animations into Skeleton-based Animations", Eurographics 2008, Apr. 2008, 9pgs.

Anguelov et al., "Recovering Articulated Object Models from 3D Range Data", In Proceedings of the 20th Conference on Uncertainty in Artificial Intelligence, pp. 18-26.

Anguelov et al., "SCAPE: Shape Completion and Animation of People", Proceedings of the SIGGRAPH Conference, pp. 408-416, 2005.

Anguelov et al., "The Correlated Correspondence Algorithm for Unsupervised Registration of Nonrigid Surfaces", In Conference on Computer Vision and Pattern Recognition (VCPR), pp. 77-84.

Cheung et al., "Shape-from Silhouette of Articulated Objects and its use for Human Body Kinematics Estimation and Motion Capture", In Conference on Computer Vision and Pattern Recognition (CVPR), pp. 77-84, 2003.

Curless et al., "The Space of Human Body Shapes: Reconstruction and Parameterization form Range Scans", ACM Transactions on Graphics, 22(3), pp. 587-594, 2003.

Curless et al., "A Volumetric Method of Building Complex Models from Range Images", Proceedings of SIGGRAPH 1996, pp. 303-312, 1996.

Curless et al., "A Volumetric Method of Building Complex Models from Range Images", Retrieved from http://graphics.stanford.edu/papers/volrange/volrange.pdf, pp. 1-10, 1996.

Curless et al., "Articulated Body Deformation from Range Scan Data", ACM Transactions on Graphics, 21(3), pp. 612-619, 2002.

Davis et al., "Filing Holes in Complex Surfaces Using Volumetric Diffusion", Symposium on 3 D Data Processing, Visualization, and Transmission, 11 pgs. 2002.

De Aguiar, et al., "Marker-Less 3D Feature Tracking for Mesh-Based Human Motion Caption", Human Motion 2007, LNCS 4818, 2007, pp. 1-15.

Garland et al., "Surface Simplification Using Quadric Error Metrics", Proceedings of SIGGRAPH 1997, pp. 209-216, 1997.

Gao et al., "Motion normalization: the preprocess of motion data", 2005, pp. 253-256.

Hahnel et al., "An Extension of the ICP Algorithm for Modeling Nonrigid Objects with Mobile Robots", Proceedings of the International Joint Conference on Artificial Intelligence (IJCAI), 6pgs, 2003.

Hilton et al., "From 3D Shape Capture to Animated Models", First International Symposium on 3D Processing, Visualization and Transmission (3DVPT2002), pp. 246-255, 2002.

Kahler et al., "Head shop: Generating Animated Head Models with Anatomical Structure.", ACM SIGGRAPH Symposium on Computer Animation, pp. 55-64, 2002.

Lewis, "H.264/MPEG-4 AVC CABAC overview", http://www.theonlineoasis.co.uk/notes.html, Dec. 3, 2012.

Lewis et al., "Pose Space Deformation: A Unified Approach to Shape Interpolation and Skeleton-Drive Deformation", Proceedings of ACM SIGGRAPH 2000, pp. 165-172, 2000.

Liepa, P., "Filing Holes in Meshes", Proc. of the Eurographics/ACM SIGGRAPH Symposium on Geometry Processing, pp. 8 pgs., 2003.

(56) References Cited

OTHER PUBLICATIONS

Ma et al., "An Invitation to 3D Vision", Springer Verlag, pp. 15-28, 2004.
Mamou et al., "Temporal OCT-based compression of 3D dynamic meshes", ICCOM'06 Proceedings of the 10th WSEAS international conference on Communications, 2006, 74-79.
Mamou et al., "The New MPEG-4/FAMC Standard for Animated 3D Mesh Compression", IEEE 3DTV-CON'08, May 2008.
Max Planck Institut Informatik, "Automatic Conversion of Mesh Animations into Skeleton-based Animations", http://www.mpiinf.mpg.de/~edeaguia/animation_eg08.html; Mar. 30, 2008, 9pgs.
Mohr et al., "Building Efficient, Accurate Character Skins from Examples", ACM Transactions on Graphics, 22(3), 562-568, 2003.
Noh et al., "Expression Cloning", Proceedings of ACM SIGGRAPH 2001, pp. 277-288, 2001.
Okada, R et al., "A Video Motion Capture System for InteractiveGames.", MVA2007 IAPR Conference on MachineVisionApplications, Tokyo, Japan Retrieved from: http://scholar.google.comIscholar?hl=en&lr=&cItes=18279969631012262246&um=1&1e=UTF-8&sa=X&el=7SEVTJPblsGInQenipH-Cw&ved=OCDACzglwBA, Retrieved on Jun. 11, 2010, May 16-8, 2007.
Park et al., "On-line locomotion generation based on motion blending", ACM SIGGRAPH Symposium on Computer Animation. San Antonio, Jul. 21, 2002, pp. 105-111.
Park et al., "On-line motion blending for real-time locomotion generation", Computer Animation & Virtual Worlds Wiley, UK vol. 15, No. 3-4, Jul. 2004, pp. 125-138.
Popovic et al., "Style-Based Inverse Kinematics", ACM Transactions in Graphics, 23(3), 522-531, 2004.
Safonova, et al., "Construction and optimal search of interpolated motion graphs", ACM SIGGRAPH, 2007, 11 pgs.
Sand et al., "Continuous Capture of Skin Deformation", ACM Transactions on Graphics, 22(3), pp. 578-586, 2003.
Scholkopf et al., "A Tutorial on support Vector Regression", In Technical Report NC2-TR-1998-030. NeuroCOLT2, 1998.
Seo et al., "An Automatic Modeling of Human Bodies from Sizing Parameters", In Symposium on Interactive 3D Graphics, pp. 19-26.
Sloan et al., "Shape by Example", In 2001 Symposium on Interactive 3D Graphics, pp. 135-144, 2001.
Smola et al., "A Tutorial on Support Vector Regression", Statistics and Computing London 14(3) pp. 199-222, 2004.
Sumner et al., "Deformation Transfer for Triangle Meshes", Proceedings of ACM SIGGRAPH 2004, 23(3), pp. 399-405, 2004.
Szliski et al., "Matching 3D Anatomical Surfaces with Non-rigid Deformations Using Octree-splines", International Journal of Computer Vision,18(2), pp. 171-186, 1996.
Tung et al., "Topology Matching for 3D Video Compression Computer Vision and Pattern Recognition", IEEE Conference Computer Vision and Pattern Recognition, 2007, Jun. 2007.
Vasilescu et al., "Multilinear Analysis of Image Ensembles: Tensorfaces", European Conference on Computer Vision (ECCV), pp. 447-460, May 2002.
Vlasic et al., "Face Transfer with Multilinear Models", ACM Transactions on Graphics 24(3), pp. 426-433, 2005.
Vlasic et al., "Multilinear Models for Facial Synthesis", SIGGRAPH Research Sketch, 1 pg., 2004.
Von Luxburg, "A Tutorial on Spectral Clustering. Statistics and Computing", 2007, 32pgs.
Wang et al., "Multi-weight Enveloping: Least Squares Approximation Techniques for Skin Animation", ACM SIGGRAPH Symposium on Computer Animation, pp. 129-138, 2002.
Zhidong, et al., "Control of motion in character animation", Jul. 14, 2004, pp. 841-848.

\* cited by examiner

REAL TIME GENERATION OF ANIMATION-READY 3D CHARACTER MODELS

CROSS-REFERENCE TO RELATED APPLICATIONS

This application claims priority to U.S. Provisional Application No. 61/200,212 filed Nov. 24, 2008 and as a Continuation-in-Part of U.S. patent application Ser. No. 12/584,117 filed Aug. 31, 2009, the disclosures of which are incorporated herein by reference in their entirety.

FIELD OF THE INVENTION

The present invention relates generally to computer generated graphics, and more specifically to the real time generation of 3D characters for use in animation.

BACKGROUND

The use of 3D content and in particular of animated 3D characters is becoming increasingly popular. In animated movies, games and virtual worlds, 3D character models or avatars are often one of the most essential and compelling aspects of the experience. Despite the increased demand for animated 3D characters, 3D character models for use in animation continue to be created by artists with specialized training. The artist typically creates a 3D character animation by manually producing a 3D characters model and motion data that animates the 3D model. A common process for generating 3D character animations is illustrated in FIG. 1. The process 100 involves creating (102) a mesh of the 3D character. A mesh is a collection of vertices and polygons that define the shape of an object in 3D. A texture is created (104) and is applied (106) to the mesh. The texture defines the appearance of the mesh. In order to enable the animation of the 3D character, a skeleton is created (108) and skinning weights (110) are defined. The skeleton defines the articulated body parts of the mesh and the skinning weights define the deformation of the mesh as a function of the motion of the skeleton. The process of defining a skeleton and skinning weights is often referred to as rigging the 3D character. The rigging of a 3D character is usually quite complex and time-consuming, and requires specific 3D modeling knowledge/education. This represents a barrier to the generation of 3D animation content from a wider audience. Moreover, most 3D modeling took require the installation of $3^{rd}$ party software, which represents a further barrier to widespread use and diffusion of 3D animation related art.

SUMMARY

Systems and methods in accordance with embodiments of the invention are capable of automatically generating animation-ready 3D character models. In many embodiments, animation-ready 3D character models are generated in real time based upon a description of a desired 3D character provided via a web based user interface. In several embodiments, animation-ready 3D character models are generated by animators for use in animations. In other embodiments, animation-ready 3D character models are generated in interactive environments such as video games and are used to generate animations within the game.

One embodiment of the invention includes an application server configured to receive the user defined model parameters and the clothing selection via a user interface. In addition, the application server includes a generative model and the application server is configured to generate a 3D anatomical mesh based upon the user defined model parameters using the generative model, the application server includes at least one clothing mesh template including a clothing mesh, a template skeleton, and skinning weights and the application server is configured to apply the clothing mesh from the clothing mesh template corresponding to the user clothing selection to the generated 3D anatomical mesh to create a clothed mesh, the application server is configured to adjust the template skeleton of the clothing mesh template corresponding to the user clothing selection based upon the shape of the clothed mesh, the application server is configured to generate skinning weights based upon the skinning weights of the clothing mesh template corresponding to the user clothing selection, and the application server stores an animation-ready 3D character model including the clothed mesh, the adjusted skeleton, and the generated skinning weights.

In a further embodiment, the clothed mesh has polygon correspondence with the clothing mesh template corresponding to the user clothing selection.

In another embodiment, the generated skinning weights are the same as the skinning weights of the clothing mesh template corresponding to the user clothing selection.

In a still further embodiment, the clothing mesh model includes UV mappings used to map texture to the clothing mesh model, and the application server is configured to apply modified textures to the clothed mesh utilizing the UV mappings.

In still another embodiment, the user interface is a web based user interface generated by the application server.

In a yet further embodiment, the application server is configured to generate the animation-ready 3D character model in real time in response to receipt of the user defined model parameters and the clothing selection via the web based user interface.

In yet another embodiment, the generative model is produced by principal component analysis of a data set of 3D meshes, the application server is configured to transform the user defined model parameters in terms of the principal components of the generative model, and the 3D anatomical mesh is generated using the transformed user defined model parameters and the generative model.

In a further embodiment again, the application server is configured to apply the clothing mesh template to the 3D anatomical mesh using a Mean Value Coordinates calculation that deforms the vertices of the clothing mesh template in response to the location of the vertices of the 3D anatomical mesh.

In another embodiment again, the application server is configured to apply a blend shape process to correct artifacts in the clothed mesh introduced by the Mean Value Coordinates calculation.

In a further additional embodiment, the application server is configured to adjust the template skeleton based upon the deformation of the clothing mesh template using a Mean Value Coordinates calculation.

In another additional embodiment, the application server is configured to apply the clothing mesh template to the 3D anatomical mesh by morphing the clothing mesh template into the 3D anatomical mesh using a non-rigid mesh registration process.

An embodiment of the method of the invention includes receiving model parameters and a clothing selection via a user interface, automatically generating a 3D anatomical mesh based upon the received model parameters, automatically applying a clothing mesh template based upon the clothing selection to the generated 3D anatomical model to produce a clothed mesh, and automatically rigging the clothed mesh by adjusting the template skeleton and generating skinning weights based upon the skinning weight of the clothing mesh template.

A further embodiment of the method of the invention includes mapping the model parameters to principal components of a generative model, where the generative model is created by principal component analysis of a data set of 3D meshes; and generating a 3D anatomical mesh based upon the mapped model parameters using the generative model.

In another embodiment of the method of the invention applying a clothing mesh template based upon the clothing selection to the generated 3D anatomical model to produce a clothed mesh further includes using a Mean Value Coordinates calculation that deform the vertices of the clothing mesh template in response to the location of the vertices of the 3D anatomical mesh.

A still further embodiment of the method of the invention also includes applying a blend shape process to correct artifacts in the clothed mesh introduced by the Mean Value Coordinates calculation.

In still another embodiment of the method of the invention, adjusting the template skeleton further includes adjusting the joints of the skeleton based upon the deformation of the clothing mesh template using a Mean Value Coordinates calculation.

In a yet further embodiment of the method of the invention, applying a clothing mesh template based upon the clothing selection to the generated 3D anatomical model to produce a clothed mesh further includes applying the clothing mesh template to the 3D anatomical mesh by morphing the clothing mesh template into the 3D anatomical mesh using a non-rigid mesh registration process.

In yet another embodiment of the method of the invention the clothed mesh has polygon correspondence with the clothing mesh template selected by the user.

In a further embodiment again of the method of the invention, the generated skinning weights are the same as the skinning weights of the clothing mesh template.

Another embodiment again of the method of the invention further includes modifying the texture of the clothed mesh by applying textures using UV mappings that were used to map texture to the clothing mesh model.

Another further embodiment of the method of the invention includes deforming the vertices of the clothing mesh based upon the vertices of the 3D anatomical mesh using a Mean Value Coordinates calculation.

Still another further embodiment of the method of the invention includes applying a blend shape process to correct artifacts in the clothed mesh introduced by the Mean Value Coordinates calculation.

Yet another further embodiment of the method of the invention includes modifying the location of the joints of the template skeleton based upon the deformation of the template mesh using a Mean Value Coordinate calculation.

DETAILED DESCRIPTION

Figure 1:
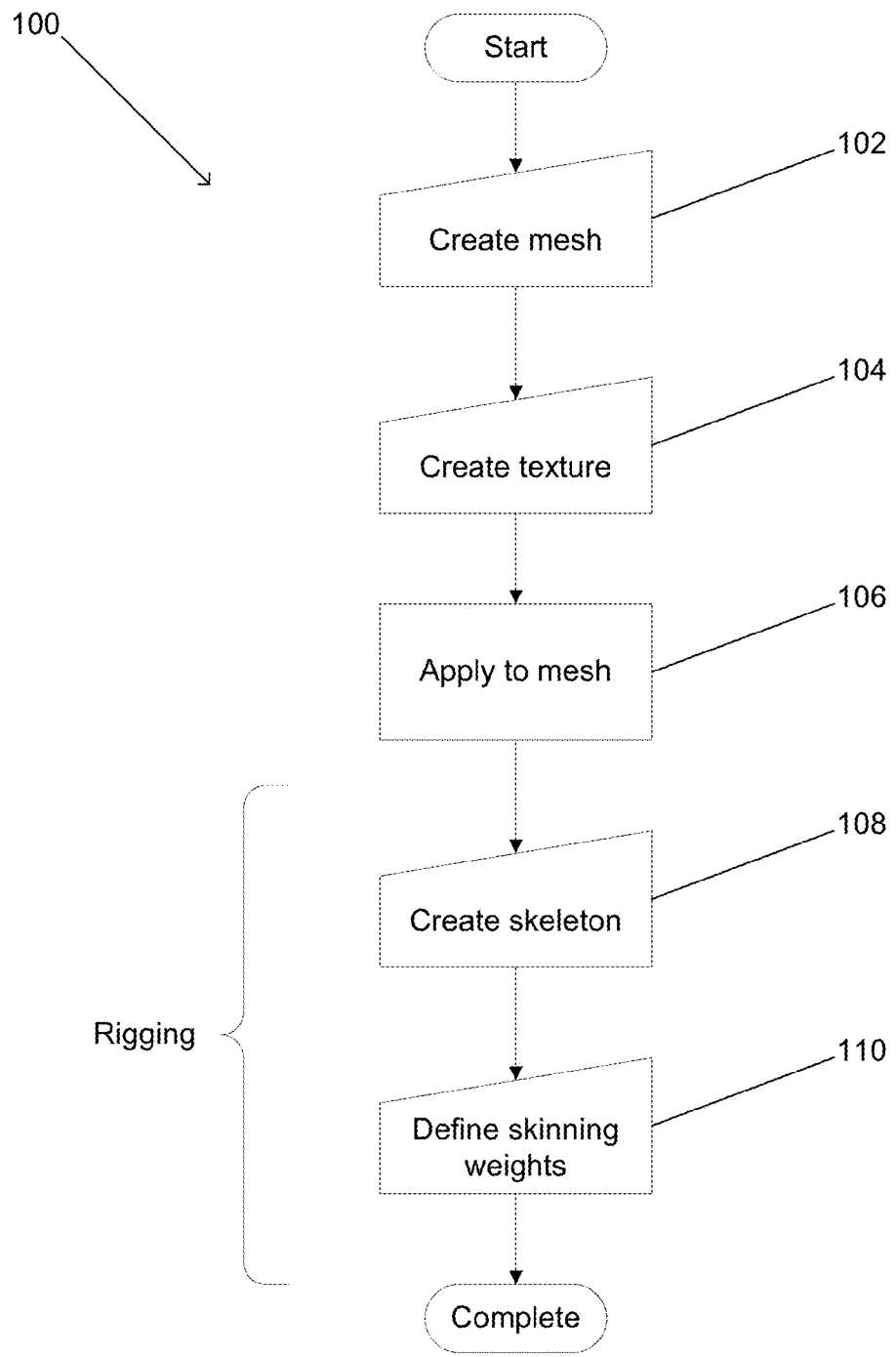
FIG. 1 is a flow chart illustrating a common process for generating 3D character animations.

Turning now to the drawings, systems and methods for generating animation-ready 3D character models in accordance with embodiments of the invention are illustrated. An animation-ready 3D character model is typically considered to be a 3D character model for which a mesh, a skeleton, and skinning weights are defined. The skeleton and the skinning weights define the deformation of the mesh during articulation of the body parts of the 3D character. Therefore, the combination of the mesh, skeleton, and skinning weights is sufficient to enable the animation of the 3D character. In many embodiments, an animation-ready 3D character model is generated in response to a description of the desired characteristics of the 3D character using a generative model. In a number of embodiments, the generative model is used to generate a 3D anatomical mesh. The 3D anatomical mesh defines the body of the character. Each 3D anatomical mesh generated by the generative model possesses polygon correspondence with a number of clothing mesh templates, which can be applied to the generated 3D mesh. A clothing mesh template is template that is typically created by animator, in which a clothing mesh is applied to a 3D anatomical mesh and the mesh is rigged with a skeleton and skinning weights. A user can select a clothing mesh template to apply to the generated 3D anatomical mesh. The clothing mesh template includes a template skeleton, which can be automatically adjusted according to the generated 3D anatomical mesh to which the clothing mesh is applied. When a clothing mesh is applied to a 3D anatomical mesh, the result is often referred to as a clothed mesh. Due to the polygon correspondence between the clothing template mesh and the generated 3D anatomical mesh, the same UV mappings used to apply texture to the clothing mesh template can be used to map textures to the clothed mesh. Therefore, the user can modify the texture of the clothed mesh in real time. For example, the color and/or pattern of the clothing can be changed by the user. The clothing mesh template also includes skinning weights, which can be directly applied to rig the 3D character model due to the polygon correspondence between the generated 3D anatomical mesh and the clothing mesh template. The application of the clothing mesh template to the generated 3D mesh typically involves using the 3D mesh to "drive" the deformation of the clothing mesh to create the clothed mesh. In many instances, the process of deforming the clothing mesh template based upon the generated 3D anatomical mesh results in artifacts at intersections of body parts of the 3D character. Therefore, many embodiments apply a process to correct mesh flattening and other artifacts introduced by application of the clothing mesh template to the generated 3D mesh.

In several embodiments, a generative model for 3D characters is created using unsupervised learning or supervised learning. In both cases the learning is achieved using a set of example 3D meshes that can involve labeled data. The generative model enables the generation of new 3D meshes that interpolate or extrapolate the space defined by the example 3D meshes. The labels are used by the generative model to express the space of 3D meshes in terms of meaningful parameters that describe the anatomical characteristics of a specific 3D mesh. For example, the model parameters can include but are not limited to height, weight, and/or attractiveness.

In many instances, a user interface is provided that enables a user to automatically create, view, and animate a 3D character model in real time. Systems and methods for generating animation-ready 3D characters in accordance with embodiments of the invention are discussed further below.

Systems for Generating an Animation-Ready 3D Character Model

Figure 2:
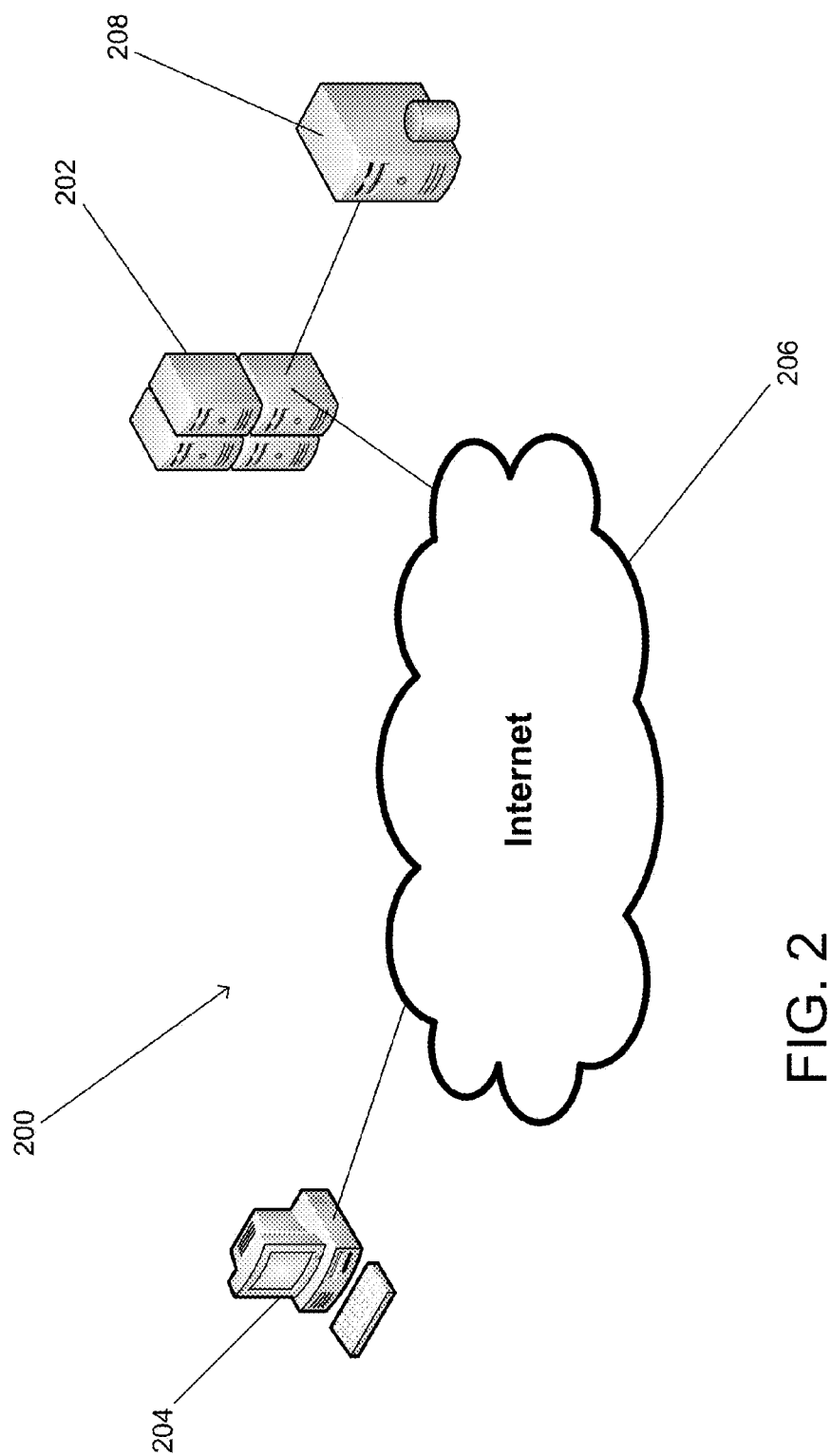
FIG. 2 is a network diagram illustrating a system for automatically generating animation-ready 3D characters based upon parameters received from a user via the Internet in accordance with an embodiment of the invention.

A system for generating an animation-ready 3D character model in accordance with the embodiment of the invention is illustrated in FIG. 2. The system 200 includes an application server 202 that is configured to communicate with a client device 204 via a network such as the Internet 206. The application server is typically configured to provide a user interface to the client device via which a user is able to specify characteristics of a 3D character. The application server includes a generative model. In many embodiments, the application server uses the description provided via the client device to create a 3D anatomical mesh. The application server can also include a number of clothing mesh templates. The clothing mesh templates typically include a clothing mesh constrained to have polygon correspondence with the 3D anatomical meshes generated by the generative model, a template skeleton, and a set of skinning weights. In several embodiments, the user can specify clothing to apply to the 3D character and the appropriate clothing mesh is applied to the generated 3D anatomical mesh. The application server adjusts the template skeleton for the clothing mesh template in accordance with the shape of the 3D mesh created by the application of the clothing mesh to the 3D anatomical mesh. The application server can then apply the skinning weights from the clothing mesh template to rig the generated 3D character model. During the generation of the animation-ready 3D character model, artifacts can occur at complex vertices of the 3D mesh and the application server is configured to correct these artifacts. In the illustrated embodiment, the generative model used to produce the 3D anatomical mesh is created using a database of character shapes 208. Any of a variety of processes can be used in the creation of a generative model including supervised learning in which each of the example 3D meshes in a database is labeled and a process such as the process described in U.S. patent application Ser. No. 11/881,172 entitled "Shape Completion, Animation and Marker-less Motion Capture of People, Animals or Characters" to Anguelov et al., filed Jul. 25, 2007, the disclosure of which is incorporated by reference in its entirety, is used to build a model describing the space of anatomical shapes for a particular type of 3D character. The process described by Anguelov et al. involves modeling the deformations between the shape of each example 3D mesh as a linear model. Although other processes can be utilized, the process described by Anguelov et al. includes the advantage that all 3D anatomical meshes generated by the model possess polygon correspondence. Polygon correspondence refers to the fact that each 3D mesh includes the same number of polygons and that each polygon has a corresponding polygon in all of the 3D meshes. As is discussed further below, generating 3D anatomical meshes that have polygon correspondence can provide a number of benefits during the application of a clothing mesh and/or during the application of skinning weights to complete the rigging of the generated 3D character model. Processes for building a generative model and the use of a generative model in the automatic generation of animation-ready 3D character models in accordance with embodiments of the invention are discussed further below.

The generation of a 3D character by a system in accordance with an embodiment of the invention can be performed iteratively in real time and in a variety of contexts. For example, an animation-ready 3D character model can be generated by an animator using a web based user interface provided by the application server and the animation-ready 3D character model can be downloaded to a client device for animation. In many instances, the client device can also specify motions to animate the generated 3D character model and download both the 3D character model and the motion data used to animate the 3D character model. The animator could specify the motion data manually or generate the motion data automatically using a process such as one of the processes described in accordance with the process described in U.S. patent application Ser. No. 12/370,269 entitled "Interactive Design, Synthesis and Delivery of 3D Character Motion Data Through the Web", to Taylor et al., filed Feb. 2, 2009 the disclosure of which is incorporated by reference herein in its entirety. Another context in which an animation-ready 3D character model in accordance with an embodiment of the invention can be generated in real time is the creation of a 3D character or avatar by a user for use in a 3D interactive application such as a video game. An application server in accordance with an embodiment of the invention can enable a user to specify the characteristics and clothing of a 3D character, and the generated 3D character model can be animated within the 3D video game. Systems and methods in accordance with embodiments of the invention can also be utilized to generate animation-ready 3D character models or animated 3D characters in a variety of contexts including but not limited to those outlined above and contexts in which the generation is performed offline on a local workstation, and/or in a non-real time environment.

Generating a 3D Character

Figure 3:
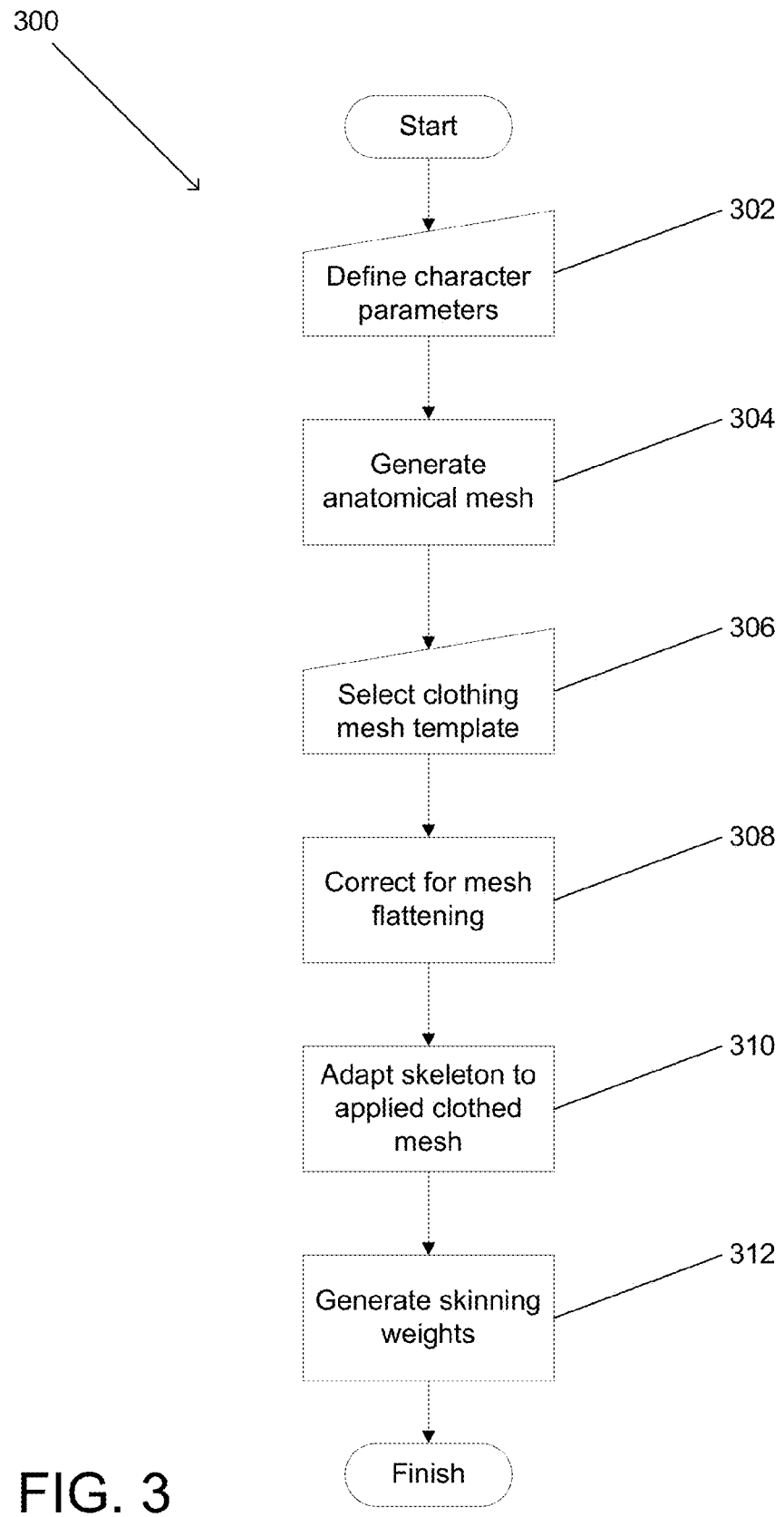
FIG. 3 is a flow chart illustrating a process for generating animation-ready 3D characters in accordance with an embodiment of the invention.

A process for generating an animation-ready 3D character model in accordance with an embodiment of the invention is illustrated in FIG. 3. The process 300 commences when a user provides (302) a definition of a desired 3D character. The definition is typically provided using a series of model parameters, where each model parameter describes a particular anatomical characteristic of the 3D character. Examples of model parameters include, but are not limited to, height, weight, musculature, and attractiveness. The description of the 3D character is used to automatically generate (304) a 3D anatomical mesh using a generative model. The automatic generation of a 3D anatomical mesh is discussed further below. The user can also specify clothing for the character. Typically the clothing is selected (306) from one of a number of options, where each option corresponds to a clothing mesh template. In many instances, artifacts such as mesh flattening occur at complex vertices when a clothing mesh is applied to the generated 3D anatomical mesh. Therefore, a process can be applied to correct (308) for introduced artifacts in the clothed mesh of the 3D character. Processes for correcting for introduced artifacts are discussed further below. Once a clothed mesh has been generated by the application of a clothing mesh to a generated 3D anatomical mesh, the template skeleton of the clothing mesh model is automatically modified (310) based upon the shape of the clothed mesh. The rigging of the clothed mesh is then completed by automatically generating skinning weights (312) for the clothed mesh. In a number of embodiments, polygon correspondence between the clothed mesh and the clothing mesh template enables the clothed mesh to be rigged by simply applying the same skinning weights from the clothing mesh template to the clothed mesh of the 3D character. The automatic rigging of animation-ready 3D character models is also discussed further below.

As can be readily appreciated from a comparison of the processes illustrated in FIGS. 1 and 3, the process 300 illustrated in FIG. 3 requires considerably less specialized knowledge in order to generate an animation-ready 3D character model. A user need simply describe the 3D character using a simple user interface and select clothing from a number of clothing options. The generation of the mesh, skeleton and skinning weights for the 3D character model is entirely automated. In the event that the user is unsatisfied with the appearance of the 3D character, the user can modify the description of the character and automatically regenerate the 3D character until satisfied. In many embodiments, the computation complexity of generating an animation-ready 3D character model is sufficiently economical that the 3D character model can be generated in real time. Although a specific process is illustrated in FIG. 3 for generating an animation-ready 3D character model, any of a variety of other processes involving a user specifying the characteristics and clothing of a 3D character and then automatically generating a 3D anatomical mesh to which clothing meshes can be applied can be utilized in accordance with embodiments of the invention.

Creation of a Generative Model

The process illustrated in FIG. 3 assumes the presence of a generative model that can be used to generate a 3D anatomical mesh for a 3D character based upon characteristics specified by a user. A generative model can be constructed using a machine learning technology similar to the machine learning technology described in U.S. patent application Ser. No. 11/881,172, incorporated by reference above, and further described by Anguelov et al., "SCAPE: Shape Completion and Animation of People" Proceedings of SIGGRAPH Conference (2005), the disclosure of which is also incorporated by reference herein in its entirety. In many embodiments, Principal Component Analysis (PCA) is used to learn a generative model for a particular type of 3D character. For example, separate generative models can be created for men, women, boys, girls, and/or different species of animal. PCA is a mathematical procedure that transforms a number of possibly correlated variables into a smaller number of uncorrelated variables called principal components.

A data set of 3D anatomical meshes can be derived from range scans of real individuals, animals, or sculptures, or from synthetic data. To perform PCA, the 3D anatomical meshes in the data set are registered and placed in correspondence with one of the meshes, which is selected as a template mesh, and a single generative or morphable model is created by computing point to point correspondences between the template mesh and the remaining 3D anatomical meshes in the data set. In several embodiments, PCA is applied to vertex positions as described by Blanz et al. "A morphable model for the synthesis of 3D faces", Proceedings of ACM SIGGRAPH (1999), the disclosure of which is incorporated by reference herein in its entirety. In a number of embodiments, PCA is applied to determine the correspondence between the polygons of the template mesh and the other 3D anatomical meshes in the data set as described by Anguelov et al. in the paper incorporated by reference above. An advantage of using PCA based upon polygon correspondence is that all 3D anatomical meshes generated by the anatomical model possess polygon correspondence, which can simplify the processes associated with applying clothing meshes to the generated 3D anatomical mesh, and applying skinning weights to rig the clothed mesh. In other embodiments, PCA can be applied to any of a variety of different manually or automatically identified correspondence characteristics. Alternatively, processes other than PCA can be utilized to create a generative model capable of generating 3D anatomical meshes for a 3D character type.

Re-Parameterization of Principal Components

Once the principal components for the 3D character type are identified using PCA of the data set, anatomical meshes for 3D characters can be generated based upon a specification of principal components. In order to have a meaningful interaction with the principal components that define the shape of the 3D mesh of a character type's anatomy, the principal components can be re-parametrized in terms concepts that are meaningful when describing the anatomical shape of a 3D character. For example, the principal components can be projected onto the axis of a multi-dimensional space describing anatomical shape such as, but not limited to, weight, height, muscularity, and attractiveness. Re-parametrization can leverage both automatic and manual labeling of the 3D anatomical mesh data set by enabling each principal component or groups of principal components to be expressed as a function of a set of labels. In many embodiments, these functions are automatically learned based upon the relationship between the labels vector and the PCA components of each 3D anatomical mesh in the training data set. In several embodiments, the functions are constrained to be linear and a learning process similar to the process described by Allen et al., "The space of human body shapes: reconstruction and parameterization from range scans", ACM Transactions on Graphics 22, 3 (2003), 587-594, the disclosure of which is incorporated by reference herein in its entirety, is utilized. In a number of embodiments, a layer of non-linear transformation can be applied between the principal components and the labels provided to the user. For example, body mass index can be a function of the semantic components height and weight. In other embodiments, any of a number of different functions and/or learning processes can be utilized to re-parameterize the principal components in accordance with the requirements of a specific application.

A re-parameterized generative model in accordance with embodiments of the invention enables the generation of a 3D anatomical mesh by specification of a few simple parameters corresponding to well known anatomical characteristics. The parameters used to describe the anatomical characteristics can be referred to as model parameters. Not only does the generative model enable generation of 3D anatomical meshes similar to the 3D meshes observed in the example data set, but the generative model can also generate new 3D anatomical meshes derived from the example 3D anatomical meshes, and having model parameters inside the observed range of the principal components (interpolation). In addition, the generative model can generate new 3D anatomical models derived from the observed data, and having model parameters that our outside the observed range of the principal components (extrapolation).

Figure 4:
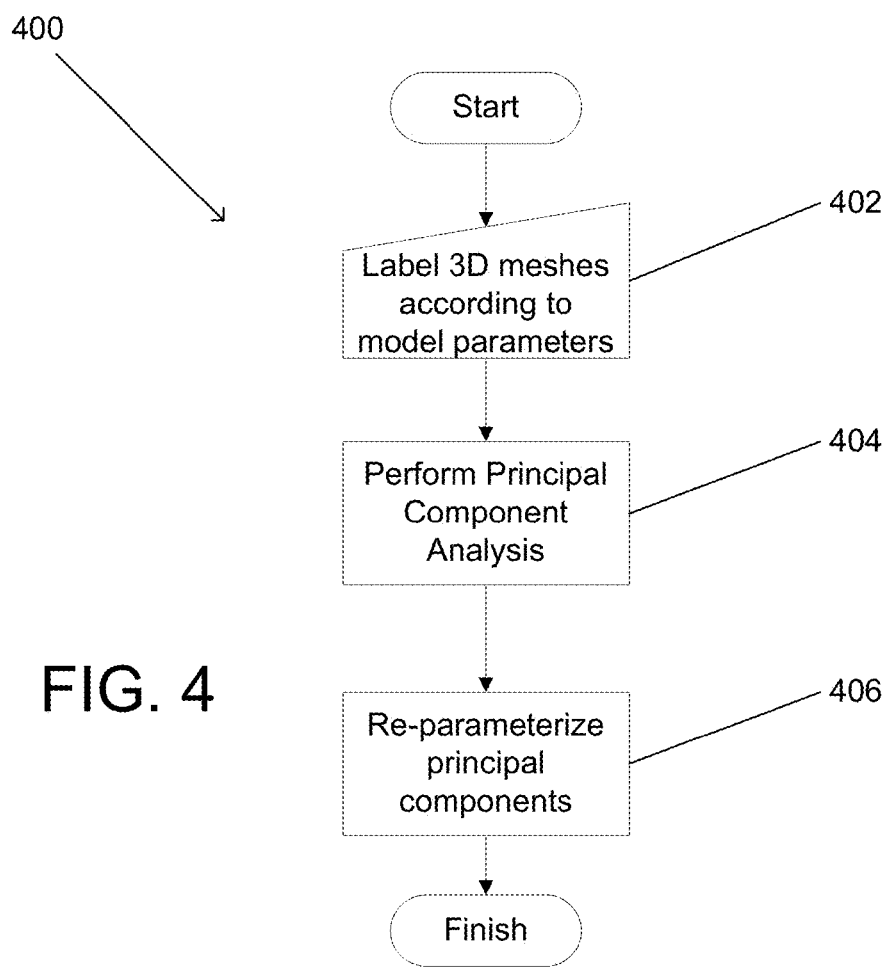
FIG. 4 is a flow chart illustrating a process for using Principal Component Analysis to create a generative model capable of generating 3D anatomical meshes based upon model parameters that define readily identifiable anatomical characteristics in accordance with an embodiment of the invention.

A process for creating a generative model capable of generating a 3D anatomical mesh for a specified 3D character type in accordance with an embodiment of the invention is illustrated in FIG. 4. The process 400 includes labeling (402) example 3D anatomical meshes, performing principal component analysis (404) on the example 3D anatomical meshes, and automatically re-parameterizing (406) the principal components of the generative model in terms of model parameters. The result is a generative model defined by the principal components and a set of functions that map model parameters to the principal components. Although a specific process is illustrated in FIG. 4, alternative processes satisfying the requirements of specific applications can be utilized to create a generative model capable of generating 3D anatomical meshes based upon model parameters in accordance with embodiments of the invention.

Application of a Clothing Mesh

Once a generative model is obtained, a 3D anatomical mesh for the particular 3D character type can be created by simply specifying desired model parameters for a 3D character that is sought to be generated. The generated 3D anatomical mesh can be used to drive different clothing mesh templates that can be used to customize the appearance of the generated 3D character. In many embodiments, the clothing mesh templates are designed by an animator and, as is discussed further below, include a template skeleton and skinning weights. In a number of embodiments, the generative model is created in such a way that all 3D anatomical meshes generated by it include the same number of corresponding polygons. As a result, the UV mapping for the texture of the clothing mesh template does not vary based upon the shape of the generated 3D anatomical model and the clothing mesh template can be applied to all 3D anatomical models generated by the generative model. In this way aspects of the appearance of the clothing including but not limited to the color and pattern of the clothing can be interactively edited in real time with the new textures simply being applied using the same UV mappings defined for the clothing mesh template.

Figure 5:
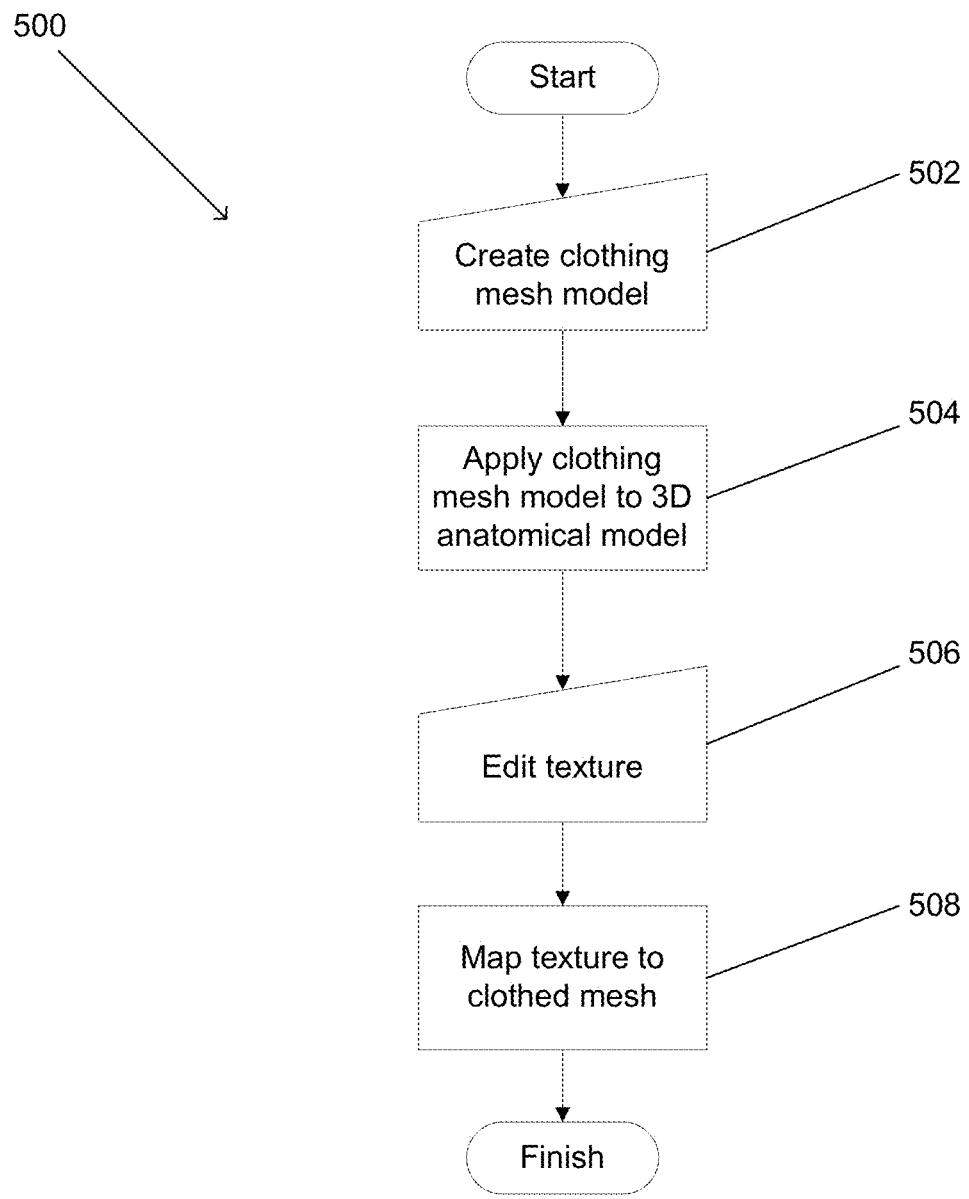
FIG. 5 is a flow chart illustrating a process for applying a clothing mesh template to a 3D anatomical mesh in accordance with an embodiment of the invention.

A process for applying a clothing mesh template to a generated 3D anatomical model in accordance with an embodiment of the invention is illustrated in FIG. 5. The process 500 includes creating (502) a clothing mesh template. The clothing mesh template is typically manually created. There are different possible processes for applying (504) a clothing mesh template to a 3D anatomical mesh. In several embodiments, a generative model is used to generate a 3D anatomical mesh, which an animator then uses as the basis for creating and rigging a clothing mesh template in a way that preserves mesh registration. The clothing mesh template has polygon correspondence with the 3D anatomical meshes generated by the generative model and as a result the Mean Value Coordinates algorithm can be utilized to "drive" the deformation of the clothing mesh template using a generated 3D anatomical mesh. The Mean Value Coordinates algorithm is generally defined by Tao et al. "Mean Value Coordinates for Closed Triangular Meshes", Proceedings of ACM SIGGRAPH (2005), the disclosure of which is incorporated by reference herein in its entirety. The clothed mesh template deformation is driven by the 3D anatomical mesh in the following way:

i) for each vertex "i" of the clothed mesh template, the mean value weight (a vector Wi that express the position of vertex "i" as a weighted average of the vertices of the 3D anatomical mesh) is computed;

ii) a matrix W is obtained that gives the position of the clothed mesh template vertices as functions of the position of the vertices of the 3D anatomical mesh;

iii) applying the positions of the vertices of a specific generated 3D anatomical mesh to the matrix W can provide the deformed vertices of the clothing mesh template, creating what is referred to as a clothed template.

As an extension, several embodiments of the invention utilize the following additional steps to express the position of the clothing mesh vertices as a function of the model parameters used to generate 3D anatomical meshes:

iv) static shape learning and semantic projection operations can be performed to output a matrix V that encodes the linear relationship between the model parameters used to generate the 3D anatomical mesh and the anatomical mesh vertices; and v) a matrix M=W*V is calculated that provides the clothed mesh template vertex positions as functions of the model parameters.

Although specific processes are presented above for deforming a clothing mesh template, other processes in accordance with embodiments of the invention can be utilized to deform clothing mesh templates in response to model parameters specified by a user. For example, in many embodiments a pre-existing clothing mesh template is created and morphed into the shape of a generated 3D anatomical mesh by virtue of a non-rigid mesh registration process such as the process described in U.S. patent application Ser. No. 12/156, 132 to Corazza et al. entitled "Automatic Generation of Human Models for Motion Capture, Biomechanics, and Animation", and filed May 29, 2008, the disclosure of which is incorporated herein by reference in its entirety. Accordingly, any of a variety of processes can be utilized to apply a clothing mesh template to a 3D anatomical mesh in accordance with an embodiment of the invention including process that involve deformation of the clothing mesh template and/or processes that involve morphing of the clothing mesh template.

In many embodiments, the applied clothing mesh template can be interactively edited (506) until a desired appearance is achieved. For example, the texture of the clothed mesh can be customized by using an input received via a user interface such as a common HSV color representation to map a new color texture to the clothed mesh. In many embodiments, the mapping (508) of textures to the clothed mesh is simplified by enforcing polygon correspondence between the clothing mesh template and the 3D anatomical mesh used to create the clothed mesh. The polygon correspondence between the clothing mesh template and the clothed mesh means that texture can be automatically applied to the clothed mesh using the same UV mappings as were used to apply texture to the clothing mesh model. In this way, new textures can be applied to the clothed mesh in real time interactive manner.

The temporal dynamic behavior of the moving clothes can be incorporated into the animation of the 3D character by coupling the kinematics of the clothing mesh template to those of the 3D anatomical mesh after a proper rigging is performed. However, prior to the rigging of a clothed mesh, a number of artifacts that can result from the generation of a 3D character and the application of a clothing mesh template may be corrected.

Correction of Mesh Flattening

Figure 6A:
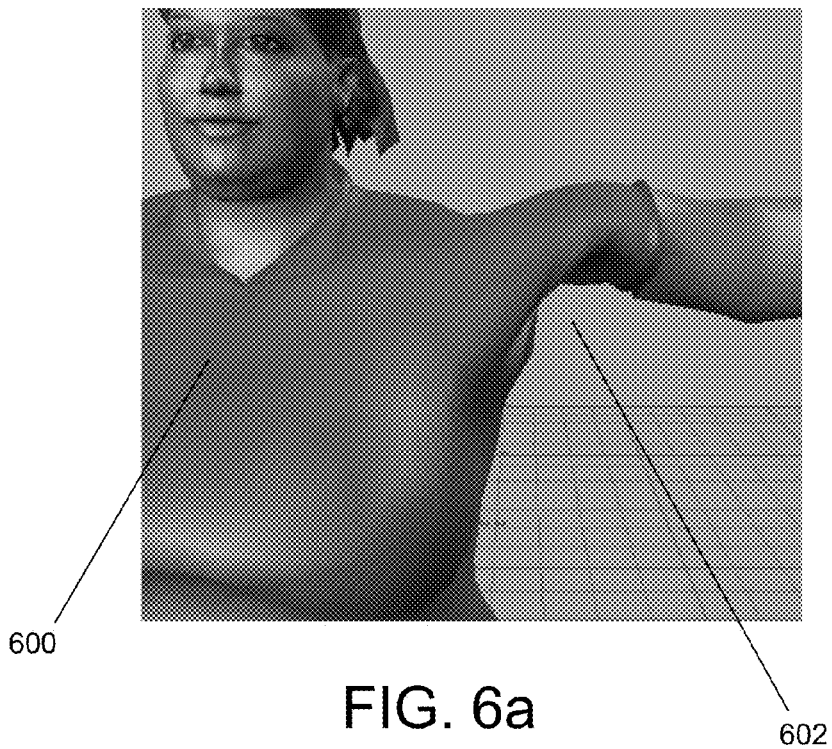
FIG. 6a is a rendering of a 3D mesh showing an artifact resulting from the application of a clothing mesh template to a 3D anatomical mesh in accordance with an embodiment of the invention.
Figure 6B:
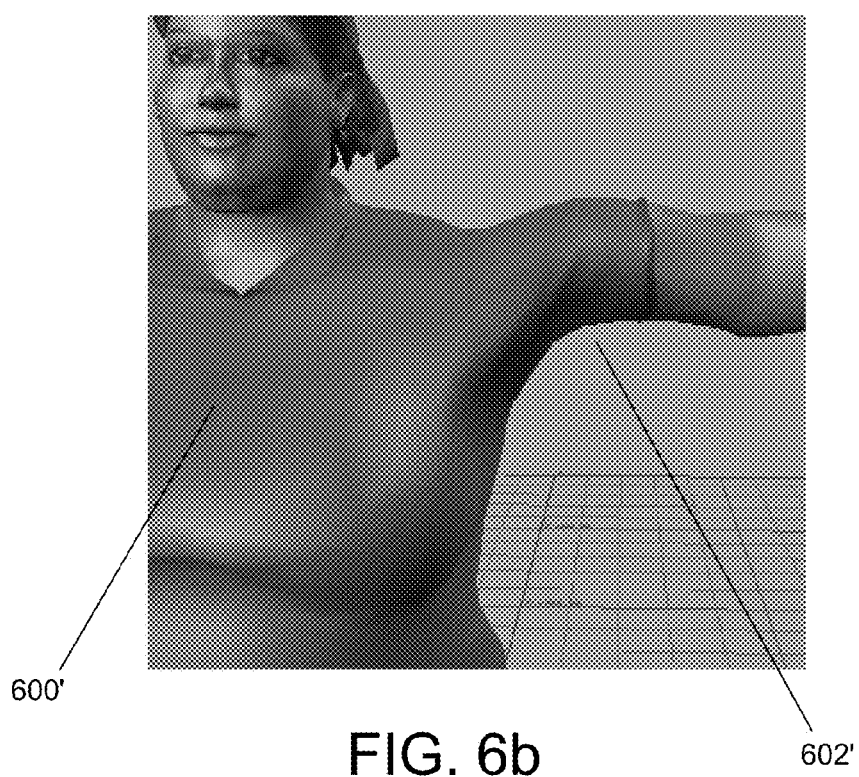
FIG. 6b is a rendering of the 3D mesh shown in FIG. 6b following application of a blend shape process to smooth artifacts introduced by the application of the clothing mesh template to the 3D anatomical mesh.

When a generative model is used to generate larger characters (specifically characters with high body mass), intersections between body parts are likely to appear on regions such as the armpits or groin. When a process such as Mean Value Coordinates is used to transfer information concerning the deformation of a 3D anatomical mesh to a clothed character (see discussion of rigging below), regions that intersect in the 3D anatomical mesh can be flattened. An example of mesh flattening is illustrated in FIG. 6a. The 3D character 600 includes a Mean Value Coordinate artifact in the form of a flattened armpit 602. In a number of embodiments, processes are applied to remove artifacts resulting from the process of applying a clothing model to a 3D anatomical mesh. In several embodiments, a professional animator corrects the artifacts that occur after the clothing mesh is applied to a generated 3D anatomical mesh. A blend shape based approach is then used to determine the deformations applied to remove the artifacts as a function of the model parameters used to generate the 3D anatomical mesh. A blend shape process uses the modifications made by the animator to deform the shape of the mesh resulting from the application of a clothing mesh template to a 3D anatomical mesh. The blend shape process can learn the extent to which blending is applied using a model such as, but not limited to, a linear model. Then, depending upon the model parameters used to generate the base 3D anatomical mesh, the blend shape process is applied to remove artifacts following the application of the clothing mesh to the 3D anatomical mesh. The results of applying a blend shape process to the mesh of the 3D character 600 shown in FIG. 6a in accordance with an embodiment of the invention is illustrated in FIG. 6b. As can be readily appreciated, the application of the blend shape process produces a 3D mesh 600' for the character in which the mesh flattening artifact that was present in the armpit region 602' of the mesh is removed. Similar processes can be utilized in accordance with embodiments of the invention to remove other artifacts.

Figure 7:
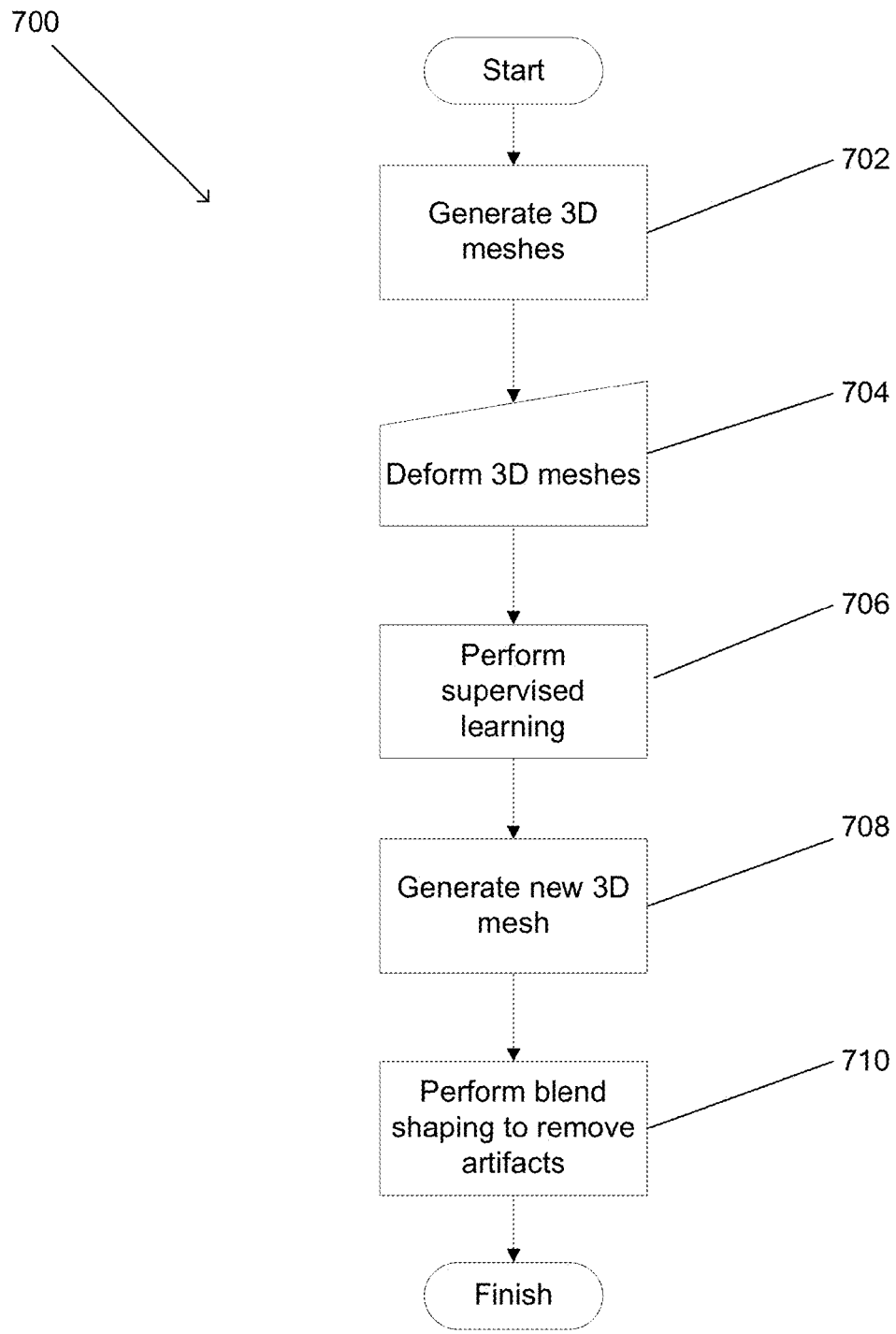
FIG. 7 is a flow chart illustrating a process for removing artifacts from 3D meshes generated by applying a clothing mesh template to a 3D anatomical mesh in accordance with an embodiment of the invention.

A process for removing artifacts following application of a clothing mesh template to a 3D anatomical mesh in accordance with an embodiment of the invention is illustrated FIG. 7. The process 700 includes generating (702) 3D meshes by applying clothing mesh templates to 3D anatomical models generated using a variety of different model parameters, deforming (704) the generated 3D meshes to eliminate artifacts, and performing (706) supervised learning to determine blending shapes and blending weights to apply based upon the model parameters of the 3D anatomical meshes. A new 3D clothed mesh can then be generated (708) by applying a clothing mesh template to a newly generated 3D anatomical model, and performing (710) blend shaping of the new 3D mesh shape based upon the model parameters used to generate the new 3D anatomical model. Although the process illustrated in FIG. 7 utilizes blend shaping, other processes suitable for specific applications can be utilized that eliminate artifacts in a 3D mesh resulting from application of a clothing mesh template to a 3D anatomical mesh in accordance with embodiments of the invention.

Adaptation of Skeleton to Clothed Mesh

In order to make a 3D character mesh created by applying a clothing mesh template to a 3D anatomical mesh animation-ready, the 3D character mesh is rigged by creating a skeleton for the 3D character mesh (i.e. the clothed mesh) and defining skinning weights. In a number of embodiments, a template skeleton is generated for each clothing mesh template and a process is applied to the skeleton to move the skeleton's joint centers based upon the shape of the clothed mesh generated by applying the clothing mesh template to a 3D anatomical mesh. In a number of embodiments, the adjustment of the template skeleton to rig the clothed mesh is performed using the Mean Value Coordinates algorithm. Mean value weights are computed for each joint of the skeleton, which are driven by the anatomical mesh deformation. In embodiments where a linear relationship exists between model parameters and the position of the mesh vertices, the skeleton joint position can be expressed as a linear function of semantic values (e.g. user's defined parameters).

Figure 8:
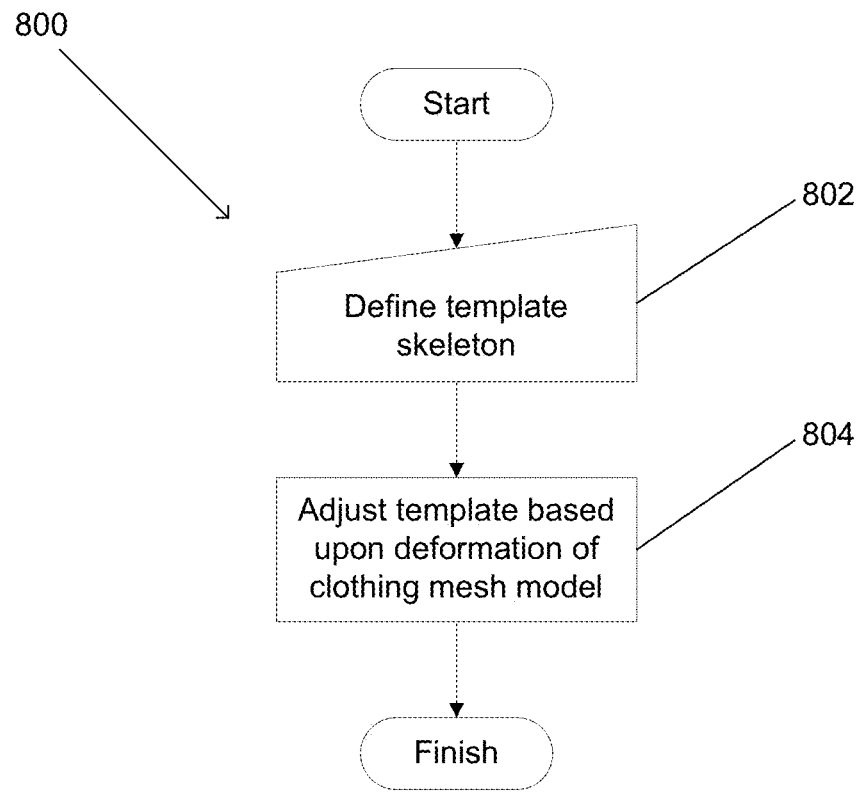
FIG. 8 is a flow chart illustrating a process for adjusting a template skeleton based upon the shape of a 3D mesh in accordance with an embodiment of the invention.

A process for adjusting a template skeleton in accordance with an embodiment of the invention is illustrated in FIG. 8. The process 800 includes defining a template skeleton 802 for each clothing mesh model and adjusting the appropriate template skeleton based upon the shape of a clothed mesh created by generating a 3D anatomical mesh using the generative model and applying a clothing mesh. In a number of embodiments, the adjustments are performed using Mean Value Coordinates algorithm to develop mean value weights that are driven by the deformation of the clothing mesh template. Although the above process assumes the application of a clothing mesh, similar processes can also be utilized to adjust a template skeleton in response to the shape of generated 3D anatomical meshes in the absence of an applied clothing mesh.

Although a specific process is illustrated in FIG. 8, other processes appropriate to a specific application can be utilized in accordance with embodiments of the invention.

Generation of skinning weights to bind clothing mesh to skeleton

In a number of embodiments, the process of generating the mesh for a 3D character model is constrained so that the same number of polygons is used to create the mesh of the 3D character irrespective of the shape of the 3D character. Therefore, skinning weights assigned for the clothed mesh of one 3D character can be applied to the clothed meshes of other 3D characters generated using the generative model. In many embodiments, an animator manually defines the skinning weights for a clothing mesh template for 3D characters generated using the generative model and then the same skinning weights are used to rig the clothed meshes of all 3D characters created using the generative model. By simply applying previously generated skinning weights to a newly generated mesh, an animation-ready 3D character model can be generated in accordance with an embodiment of the invention and rigged in real time.

Figure 9:
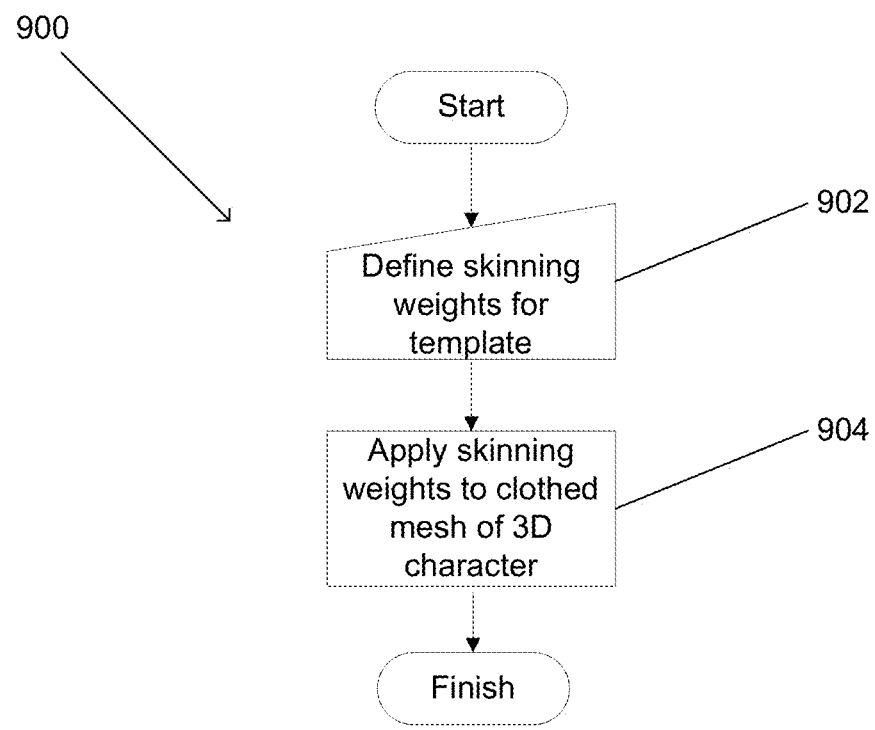
FIG. 9 is a flow chart illustrating a process for applying pre-defined skinning weights to rig a 3D mesh in accordance with an embodiment of the invention.

A process for assigning skinning weights to the mesh of a 3D character model generated in accordance with an embodiment of the invention is illustrated in FIG. 9. The process 900 includes manually defining (902) skinning weights for a clothing mesh template for 3D anatomical meshes generated using a generative model. Ideally, the skinning weights are defined with respect to the 3D clothed mesh template. However, the skinning weights can be defined with respect to the base 3D anatomical mesh generated by the generative model and transferred over to the clothed mesh template. When a clothed mesh for a new 3D character is created by using the generative model to generate a 3D anatomical mesh and then applying (904) the clothing mesh template to the 3D anatomical mesh, the character can be rigged by applying the defined skinning weights to the clothed mesh of the new 3D character.

Although a specific process is described above for applying predefined skinning weights to clothed meshes of 3D characters in reliance upon polygon correspondence between the clothed mesh and a clothing mesh template, other processes for automatically generating skinning weights where similar constraints do not apply can be utilized in rigging the meshes of 3D characters in accordance with embodiments of the invention. However, such processes typically cannot simply apply a previously defined set of skinning weights to a newly generated clothed mesh.

Real Time Generation and Iterative Design

Generation of animation-ready 3D character models in accordance with the processes outlined above can be performed in real time and an interactive user interface used iteratively to display the 3D character and to receive inputs from the user for the generation of a new animation-ready 3D character model based upon modifications to the model parameters defining the previous animation-ready 3D character model. When finalized, the animation-ready 3D character model can be animated using motion data and/or downloaded or stored for use in a variety of formats.

Figure 10:
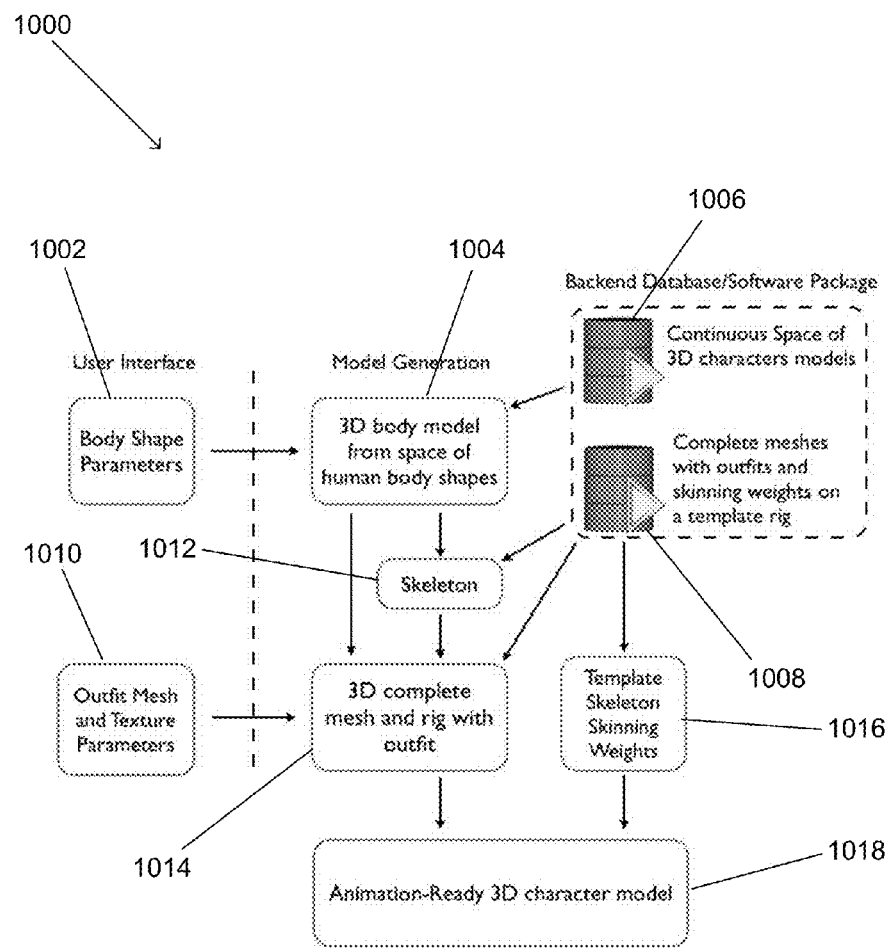
FIG. 10 is a flow diagram conceptually illustrating a process for creating an animation-ready 3D character model in accordance with an embodiment of the invention.

A workflow for generating an animation ready 3D character in accordance with an embodiment of the invention is illustrated in FIG. 10. As is illustrated in the workflow 1000, the user provides (1002) body shape or model parameters that enable the generation of a 3D anatomical mesh. The 3D anatomical mesh is generated (1004) based upon a model created using a database 1006 representative of a continuous space of 3D character shapes. The database also includes previously defined clothing mesh templates 1008 that include a clothing mesh and skinning weights defined with respect to a template skeleton. Based upon clothing and/or texture parameters selected by the user, the workflow adjusts (1012) the stored template skeleton for the selected clothes based upon the shape of the 3D anatomical mesh generated by the generative model. The appropriate clothing mesh template corresponding to the selected clothing is applied to the 3D anatomical mesh, which is rigged (1014) using the adjusted template skeleton. The template skeleton skinning weights are then applied (1016) to the rigged mesh to complete the animation-ready 3D character 1018. The process can iterate by modifying the body shape parameters and clothing parameters until the 3D character is satisfactory. Although a specific workflow is illustrated in FIG. 10, other workflows appropriate to a specific application can also be utilized in accordance with embodiments of the invention.

The present invention has been described above with respect to many specific embodiments, however, a variety of additional modifications and variations would be apparent to those skilled in the art. For example, many of the processes described above assume the automation of many steps that were previously performed manually by animators. In many embodiments, a single step in an animators work flow is automated using one of the processes outlined above and/or additional techniques can be utilized to further automate the generation of animation-ready 3D characters. Thus, embodiments of the present invention should be considered in all respects as illustrative and not restrictive.

What is claimed:

1. A system for automatically generating an animation-ready 3D character model in response to user defined model parameters, which describe anatomical characteristics of a specific 3D anatomical mesh, and clothing selections, the system comprising:
    an application server configured to receive user defined model parameters that describe anatomical characteristics of a specific 3D anatomical mesh and a clothing selection via a user interface;
    wherein the application server is configured to automatically generate a 3D anatomical mesh comprising a plurality of polygons from a template mesh based upon the user defined model parameters that describe anatomical characteristics of a specific 3D anatomical mesh received via the user interface using a generative model, where the generative model is configured to automatically generate a 3D anatomical mesh from within a space defined by interpolations and extrapolations of a set of example 3D anatomical meshes that are registered and have polygon correspondence with the template mesh;
    wherein the application server includes at least one clothing mesh template corresponding to the user clothing selection received via the user interface, where the at least one clothing mesh template includes a clothing mesh having polygon correspondence to the 3D anatomical mesh generated by the application server based upon the user defined model parameters, a template skeleton, and skinning weights;
    wherein the application server is configured to use the polygon correspondence between the clothing mesh from the at least one clothing mesh template corresponding to the user clothing selection and polygons within the generated 3D anatomical mesh to apply the clothing mesh to the generated 3D anatomical mesh and create a clothed mesh;
    wherein the application server is configured to adjust the template skeleton of the clothing mesh template corresponding to the user clothing selection based upon the shape of the clothed mesh;
    wherein the application server is configured to generate skinning weights for the clothed mesh based upon the skinning weights of the clothing mesh template corresponding to the user clothing selection;
    wherein the application server stores an animation-ready 3D character model including the clothed mesh, the adjusted skeleton, and the generated skinning weights.

2. The system of claim 1, wherein the generated skinning weights are the same as the skinning weights of the clothing mesh template corresponding to the user clothing selection.

3. The system of claim 1, wherein:
    the clothing mesh model includes UV mappings used to map texture to the clothing mesh model; and
    the application server is configured to apply modified textures to the clothed mesh utilizing the UV mappings.

4. The system of claim 1, wherein the user interface is a web based user interface generated by the application server.

5. The system of claim 4, wherein the application server is configured to generate the animation-ready 3D character model in real time in response to receipt of the user defined model parameters and the clothing selection via the web based user interface.

6. The system of claim 1, wherein:
    the generative model is produced by principal component analysis of a data set of example 3D anatomical meshes;
    the application server is configured to transform the user defined model parameters in terms of the principal components of the generative model; and
    the 3D anatomical mesh is generated using the transformed user defined model parameters and the generative model.

7. The system of claim 1, wherein the application server is configured to apply the clothing mesh template to the 3D anatomical mesh using a Mean Value Coordinates calculation that deforms the vertices of the clothing mesh template in response to the location of the vertices of the 3D anatomical mesh.

8. The system of claim 7, wherein the application server is configured to apply a blend shape process to correct artifacts in the clothed mesh introduced by the Mean Value Coordinates calculation.

9. The system of claim 7, wherein the application server is configured to adjust the template skeleton based upon the deformation of the clothing mesh template using a Mean Value Coordinates calculation.

10. The system of claim 1, wherein the application server is configured to apply the clothing mesh template to the 3D anatomical mesh by morphing the clothing mesh template into the 3D anatomical mesh using a non-rigid mesh registration process.

11. A method for generating an animation-ready 3D character model using a generative model and at least one clothing mesh template including a clothing mesh, a template skeleton, and skinning weights, the method comprising:
    receiving model parameters that describe anatomical characteristics of a specific 3D anatomical mesh and a clothing selection via a user interface generated by an application server;
    automatically generating a 3D anatomical mesh from a template mesh comprising a plurality of polygons based upon the model parameters that describe anatomical characteristics of a specific 3D anatomical mesh received via the user interface of the application server using a generative model, where the generative model is configured to automatically generate a 3D anatomical mesh from within a space defined by interpolations and extrapolations of a set of example 3D anatomical meshes that are registered and have polygon correspondence with the template mesh;
    automatically selecting a clothing mesh template from at least one clothing mesh template stored on the application server, where the selected clothing mesh template corresponds to the clothing selection received via the user interface using the application server and the clothing mesh template includes a clothing mesh having polygon correspondence to the 3D anatomical mesh generated by the application server based upon the user defined model parameters, a template skeleton, and skinning weights;
    automatically applying the clothing mesh from the selected clothing mesh template to the generated 3D anatomical mesh to produce a clothed mesh based on the polygon correspondence between the clothing mesh and polygons within the generated 3D anatomical mesh using the application server; and
    automatically rigging the clothed mesh by adjusting the template skeleton and generating skinning weights for the clothed mesh based upon the skinning weights of the selected clothing mesh template using the application server.

12. The method of claim 11, wherein generating a 3D anatomical mesh from a template mesh comprising a plurality of polygons based upon the model parameters that describe anatomical characteristics of a specific 3D anatomical mesh received via the user interface using a generative model further comprises:
    mapping the model parameters to principal components of the generative model, where the generative model is created by principal component analysis of a data set of example 3D anatomical meshes; and
    generating a 3D anatomical mesh based upon the mapped model parameters using the generative model.

13. The method of claim 11, wherein automatically applying the clothing mesh from the selected clothing mesh template to the generated 3D anatomical mesh to produce a clothed mesh using the polygon correspondence between the clothing mesh and polygons within the generated 3D anatomical mesh further comprises using a Mean Value Coordinates calculation that deform the vertices of the clothing mesh template in response to the location of the vertices of the 3D anatomical mesh.

14. The method of claim 13, further comprising applying a blend shape process to correct artifacts in the clothed mesh introduced by the Mean Value Coordinates calculation using the application server.

15. The method of claim 13, wherein adjusting the template skeleton further comprises adjusting the joints of the template skeleton based upon the deformation of the clothing mesh template using a Mean Value Coordinates calculation.

16. The method of claim 11, wherein automatically applying the clothing mesh from the selected clothing mesh template to the generated 3D anatomical mesh to produce a clothed mesh using the polygon correspondence between the clothing mesh and polygons within the generated 3D anatomical mesh further comprises applying the clothing mesh template to the 3D anatomical mesh by morphing the clothing mesh template into the 3D anatomical mesh using a non-rigid mesh registration process.

17. The method of claim 11, wherein the generated skinning weights are the same as the skinning weights of the clothing mesh template.

18. The method of claim 11, further comprising modifying the texture of the clothed mesh by applying textures using UV mappings that were used to map texture to the clothing mesh model using the application server.

19. The method of claim 11, wherein the clothing mesh template is applied by deforming the vertices of the clothing mesh template based upon the vertices of the 3D anatomical mesh using a Mean Value Coordinates calculation.

20. The method of claim 19, further comprising applying a blend shape process to correct artifacts in the clothed mesh introduced by the Mean Value Coordinates calculation using the application server.

21. The method of claim 19, wherein automatically rigging the clothed mesh comprises modifying the location of the joints of the template skeleton based upon the deformation of the clothing mesh template using a Mean Value Coordinates calculation.

* * * * *